US008233175B2

(12) United States Patent
Richards et al.

(10) Patent No.: US 8,233,175 B2
(45) Date of Patent: Jul. 31, 2012

(54) APPARATUS AND METHODS FOR INTERFACING REPROGRAPHIC AND IMAGING SYSTEMS WITH MULTIPLE SET FINISHING DEVICES

(75) Inventors: Paul N. Richards, Fairport, NY (US); Wilbert D. Douglas, Pittsford, NY (US); Richard Fischer, Lakeville, NY (US); Donald Ryan, Webster, NY (US); Carol-Lynn Goldstein, Rochester, NY (US); Jeff Gramowski, North Chili, NY (US); Mehmet Gungor, Webster, NY (US); Douglas F. Sundquist, Webster, NY (US); Diego Pereda, Fairport, NY (US); Jose Soler, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1223 days.

(21) Appl. No.: 11/758,399

(22) Filed: Jun. 5, 2007

(65) Prior Publication Data

US 2008/0304697 A1 Dec. 11, 2008

(51) Int. Cl.
*G03G 15/00* (2006.01)
*G06F 3/12* (2006.01)

(52) U.S. Cl. .... 358/1.15; 399/407; 399/361; 270/58.07; 270/58.08

(58) Field of Classification Search .................. 358/1.15, 358/1.12; 270/58.08, 58.09; 399/16, 361, 399/407, 408
See application file for complete search history.

(56) References Cited

U.S. PATENT DOCUMENTS

| | | | | |
|---|---|---|---|---|
| 5,422,705 A | * | 6/1995 | Omelchenko et al. | 399/43 |
| 6,568,675 B1 | * | 5/2003 | Boss | 271/292 |
| 7,175,173 B2 | * | 2/2007 | Anzai et al. | 270/58.09 |
| 2005/0158094 A1 | * | 7/2005 | Mandel et al. | 399/391 |

OTHER PUBLICATIONS

Xerox Corp., "Xerox Nuvera Digital Production System, In-Line Finishing (DFA) Resource Guide", Version 2.1, pp. 1-39 (2005).
Xerox Corp., "Document Feeding & Finishing Standards, DFA Level 1—Generic Specification", Version 2.0.1, 39 pages. (2005).

* cited by examiner

*Primary Examiner* — King Poon
*Assistant Examiner* — Laurence Wills
(74) *Attorney, Agent, or Firm* — Oliff & Berridge, PLC (57) ABSTRACT

Reprographic or imaging systems and methods issue a command to place multiple finishing devices into an alternating delivery mode such that consecutive sets are sent to different finishing devices, rather than to the same finishing device.

11 Claims, 10 Drawing Sheets

| COMMAND SIGNAL | NAME | FUNCTION | DFD/EFD ACTION | SIGNAL CHARACTERISTICS |
|---|---|---|---|---|
| C0 | SHEET EXIT (DFD) | INDICATES A SHEET IS EXITING BYPASS AND ENTERING DFD | DFD PREPARES TO ACCEPT A SHEET OF PAPER | NORMALLY HIGH, ACTIVE LOW |
| C1 | END OF SET (DFD) | INDICATES CURRENT SHEET ENTERING DFD IS THE LAST SHEET OF A SET | DFD PERFORMS SET OPERATION | NORMALLY HIGH, ACTIVE LOW |
| C2 | CYCLE UP (DFD) | INDICATES IOT REQUIRES USE OF DFD | DFD TURNS ON COMPONENTS REQUIRED FOR OPERATION | NORMALLY HIGH, ACTIVE LOW |
| C3 | END OF JOB (DFD) | INDICATES CURRENT SHEET ENTERING DFD IS LAST SHEET OF LAST SET OF JOB | DFD PERFORMS JOB OPERATION | NORMALLY HIGH, ACTIVE LOW |
| C4 | FEED SHEET (EFD) | INDICATES IOT REQUIRES SHEET FROM EFD | EFD FEEDS SHEET | NORMALLY HIGH, ACTIVE LOW |
| C5 | CYCLE UP (EFD) | INDICATES IOT REQUIRES USE OF ATTACHED EFD | EFD TURNS ON COMPONENTS REQUIRED FOR OPERATION | NORMALLY HIGH, ACTIVE LOW |
| C6① | INVOKE DFD FUNCTION #1 (DFD) | INDICATES TO THE DFD TO BEGIN ITS SPECIFIC OPERATION FOR FUNCTION #1 (E.G. PERFORATE) WITH THE CURRENT SHEET ENTERING THE DFD AND CONTINUE UNTIL THE SIGNAL IS REMOVED. | DFD PERFORMS SPECIFIC OPERATION BEGINNING WITH THE SHEET ENTERING THE DFD | NORMALLY HIGH, ACTIVE LOW |
| C7① | INVOKE DFD FUNCTION #2 (DFD) (NOT ENABLED ON 4135) | INDICATES TO THE DFD TO BEGIN ITS SPECIFIC OPERATION FOR FUNCTION #2 (E.G. PUNCH) WITH THE CURRENT SHEET ENTERING THE DFD AND CONTINUE UNTIL THE SIGNAL IS REMOVED) | DFD PERFORMS SPECIFIC OPERATION BEGINNING WITH THE SHEET ENTERING THE DFD | NORMALLY HIGH, ACTIVE LOW |

| STATUS SIGNAL | NAME | FUNCTION | PRINTER ACTION | SIGNAL CHARACTERISTICS |
|---|---|---|---|---|
| S0 | OFF-LINE (DFD) | INDICATES THE DFD IS OFFLINE AND NOT AVAILABLE FOR USE. CAN BE USED BY A DFD TO "HARD STOP" A PRINTER | THE SYSTEM WILL NOT ATTEMPT TO CYCLE UP A DEVICE THAT IS OFFLINE. IT WILL HALT SHEET DELIVERIES TO A DEVICE THAT GOES OFFLINE AS SOON AS POSSIBLE. WHEN A DEVICE GOES OFFLINE WHILE PROCESSING SHEETS, ANY SETS THAT HAVE NOT BEEN DELIVERED (S4 RECEIVED), WILL BE REMADE WITH SET RECOVERY. [NOTE: THIS RECOVERY WILL ONLY HAPPEN IF SPECIFICALLY REQUESTED VIA SOFTWARE COMMAND.] | LOW = OFF-LINE HIGH = ON-LINE |
| S1 | FAULTED (DFD) | INDICATES THAT DFD IS FAULTED AND IS NOT READY TO RECEIVE SHEETS CAUSING THE PRINTER TO "HARD-STOP" | THE SYSTEM WILL NOT ATTEMPT TO CYCLE UP A DEVICE THAT IS FAULTED. IT WILL HALT SHEET DELIVERY AS SOON AS POSSIBLE AND WILL INHIBIT THE END OF SET COMMAND, C1. ANY SHEETS NOT DELIVERED WILL BE REMADE WITH SHEET RECOVERY. [NOTE: THIS JOB RECOVERY WILL ONLY HAPPEN IF SPECIFICALLY REQUESTED VIA SOFTWARE COMMAND.] | LOW = OFF-LINE HIGH = ON-LINE |
| S2⑥ | FULL (DFD) | INDICATES THE DFD HAS OR WILL SHORTLY REACH A CAPACITY LIMIT OR DEPLETED A CONSUMABLE. CAN BE USED BY SOME DFD'S AS A "SOFT STOP" SIGNAL TO THE PRINTER. | THE SYSTEM WILL NOT ATTEMPT TO CYCLE UP A DEVICE THAT IS FULL, AND WILL HALT SHEET DELIVERIES TO A DEVICE THAT BECOMES FULL WHILE IT IS PROCESSING SHEETS AFTER DELIVERING ALL SHEETS IN PROCESS (A MAXIMUM OF 30 SHEETS). NO SHEETS, SETS OR JOBS WILL BE REMADE UPON RECOVERY. | LOW = OFF-LINE HIGH = ON-LINE |
| S3 | SHEET DELIVERED (DFD) | INDICATES DFD HAS SUCCESSFULLY DELIVERED A SHEET TO ITS FINAL DESTINATION OR A COMPILING DEVICE. | THE SYSTEM WILL COUNT THE CORRESPONDING SHEETS AS DELIVERED ONCE THIS SIGNAL IS [NOTE: FOR A GIVEN SET ALL RECEIVED. S3 (SHEET DELIVERED) SIGNALS MUST BE RECEIVED BY THE IOT PRIOR TO RECEIVING S4 (SET DELIVERED) SIGNAL FROM A DFD] | NORMALLY LOW; PULSED HIGH ON SHEET DELIVERY. HIGH DURATION = 50msec±10 |

TO FIG. 3C

FROM FIG. 3B

| STATUS SIGNAL | NAME | FUNCTION | PRINTER ACTION | SIGNAL CHARACTERISTICS |
|---|---|---|---|---|
| S4 | SET DELIVERED (DFD) | INDICATES DFD HAS SUCCESSFULLY DELIVERED A SET TO ITS FINAL DESTINATION. | THE PRINTER WILL COUNT THE CORRESPONDING SET AS DELIVERED ONCE THIS SIGNAL IS RECEIVED. [NOTE: SEE ABOVE NOT UNDER S3 PRINTER ACTION] | NORMALLY LOW; PULSE HIGH ON SHEET DELIVERY. HIGH DURATION= 50msec±10 |
| S5 | BULK INPUT MEDIUM LOW (EFD) | INDICATES THAT THE INPUT MEDIUM IN THE EXTERNAL EFD IS GETTING LOW. | THE PRINTER WILL TAKE APPROPRIATE ACTION. | LOW = MEDIA SUPPLY NORMAL HIGH = MEDIA SUPPLY NEEDS ATTENTION |
| S6 | NOT READY (EFD) | INDICATES EFD IS NOT AVAILABLE FOR USE. | THE PRINTER WILL NOT ATTEMPT TO CYCLE UP A EFD THAT IS NOT READY, AND WILL NOT ISSUE FEED SHEET COMMANDS TO A EFD WHICH GOES NOT READY WHILE IN USE. | LOW = NOT READY HIGH = READY |
| S7 | SHEET FED (EFD) | INDICATES THAT A SHEET IS EXITING EFD AND ENTERING THE F/S MODULE. | THE PRINTER PERFORMS WHATEVER ACTION IT REQUIRES TO ACCEPT A SHEET OF PAPER. | NORMALLY LOW; PULSED HIGH WHEN A SHEET IS FED ⑦ |

FIG. 3C

| CONDITION & MODE MATRIX | STATUS SENT BY AUTO BINDER | | | | | |
|---|---|---|---|---|---|---|
| MACHINE CONFIGURATION | SINGLE | | DUAL CONDITIONAL | | DUAL ALTERNATING | |
| CONDITION \ DFA MODE | BYPASS | BIND | BYPASS | BIND | BYPASS | BIND |
| PAPER JAM | S0, S1 | S0, S1 | — | S0, S1 | — | S0, S1 |
| AREA 1 | S0, S1 | | — | S0, S1 | — | S0, S1 |
| AREA 2 | S0, S1 | S0, S1 | — | S0, S1 | — | S0, S1 |
| AREA 3 | — | S0, S1 | — | S0, S1 | — | S0, S1 |
| AREA 4 | — | S0, S1 | — | S0, S1 | — | S0, S1 |
| AREA 5 | — | S0, S1 | — | S0, S1 | — | S0, S1 |
| AREA 6 | — | S0, S1 | — | S0, S1 | — | S0, S1 |
| BINDER JAM (AREA 7) | S0, S1 | S0, S1 | — | S0, S1 | — | S0, S1 |
| INTERNAL FAULT | S0, S1 | S0, S1 | — | S0, S1 | — | S0, S1 |
| CHIP TRAY / BOOK DRAWER MISSING OR NOT | | S0, S1 | — | S0, S1 | — | S0, S1 |
| POWER OFF | S0 – S2 | S0 – S2 | — | S0 – S2 | — | S0 – S2 |
| CHIP TRAY FULL | | S2 | — | S2 | — | S2 |
| BOOK DRAWER IS FULL | | S2 | — | S2 | — | S2 |
| BINDER STRIPS ARE DEPLETTED | | S2 | — | S2 | — | S2 |
| UI TOGGLE BUTTON DEPRESSSED | | S2 | — | S2 | — | S2 |
| SHEET DELIVERED | S3 | S3 | — | S3 | — | S3 |
| SET DELIVERED | S4 | S4 | — | S4 | — | S4 |
| FRONT COVER OPENED | — | S0, S1 | — | S0, S1 | — | S0, S1 |
| TOP COVER OPENED | S0, S1 | S0, S1 | — | S0, S1 | — | S0, S1 |

| COMMAND SIGNAL | NAME | FUNCTION | DEVICE | SIGNAL CHARACTERISTICS |
|---|---|---|---|---|
| C0 | SHEET EXIT | INDICATES A SHEET IS ENTERING DFA DEVICE | DEVICE PREPARES TO ACCEPT A SHEET OF PAPER | NORMALLY HIGH, ACTIVE LOW |
| C1 | END OF SET | INDICATES CURRENT SHEET ENTERING DEVICE IS THE LAST SHEET OF A SET | DEVICE PERFORMS SET OPERATION | NORMALLY HIGH, ACTIVE LOW |
| C2 | CYCLE UP | INDICATES IOT REQUIRES USE OF DFA DEVICE | DEVICE TURNS ON COMPONENTS REQUIRED FOR OPERATION (MOTORS, DRIVES, ETC.) | NORMALLY HIGH, ACTIVE LOW |
| C3 | END OF JOB | INDICATES CURRENT SHEET ENTERING DEVICE IS THE LAST SHEET OF THE LAST SET OF JOB | DEVICE PERFORMS JOB OPERATION | NORMALLY HIGH, ACTIVE LOW |
| C4 | RESERVED | RESERVED | RESERVED | RESERVED |
| C5 | RESERVED | RESERVED | RESERVED | RESERVED |
| C6 | DELIVERY MODE | "LINE ON" - ALTERNATING DELIVERY MODE; "LINE OFF" - CONDITIONAL DELIVERY MODE | OPERATE AS PER DELIVERY MODE | |
| C7 | TABS | "LINE ON" - TABS; "LINE OFF" - NO TABS | PERFORM TAB/NO TAB RELATED OPERATIONS | |

| NUMBER OF PAGES | 1 AUTO BINDER ||||  2 AUTO BINDERS ||||
|---|---|---|---|---|---|---|---|---|
| | SIMPLEX 144 PPM | SIMPLEX 144 PPM | DUPLEX 144 PPM | DUPLEX 144 PPM | SIMPLEX 144 PPM | SIMPLEX 144 PPM | DUPLEX 144 PPM | DUPLEX 144 PPM |
| | IOT OUTPUT (BOOKS/HR) | PERCENT PRODUCTIVITY FULL PROD. | IOT OUTPUT (BOOKS/HR) | PERCENT PRODUCTIVITY FULL PROD. | IOT OUTPUT (BOOKS/HR) | PERCENT PRODUCTIVITY FULL PROD. | IOT OUTPUT (BOOKS/HR) | PERCENT PRODUCTIVITY FULL PROD. |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | 590 | 55 | 440 | 76 |
| 9 | | | | | 580 | 60 | 424 | 78 |
| 10 | | | | | 570 | 68 | 409 | 80 |
| 11 | | | | | 561 | 71 | 395 | 82 |
| 12 | | | | | 552 | 77 | 382 | 84 |
| 13 | | | | | 527 | 78 | 369 | 85 |
| 14 | | | | | 504 | 82 | 358 | 87 |
| 15 | | | | | 483 | 84 | 292 | 98 |
| 16 | | | | | 463 | 86 | 282 | 98 |
| 17 | | | | | 445 | 88 | 273 | 98 |
| 18 | | | | | 429 | 89 | 265 | 98 |
| 19 | | | | | 413 | 91 | 257 | 98 |
| 20 | | | | | 399 | 92 | 250 | 98 |
| 21 | | | | | 386 | 94 | 243 | 98 |
| 22 | | | | | 373 | 95 | 198 | 99 |
| 23 | | | | | 362 | 96 | 194 | 99 |
| 24 | 180 | 50 | 96 | 50.00 | 351 | 97 | 189 | 99 |
| 25 | 176 | 51 | 95 | 50.55 | 337 | 97 | 185 | 99 |
| 30 | 160 | 56 | 79 | 52.73 | 282 | 98 | 147 | 99 |
| 40 | 135 | 63 | 65 | 22.98 | 213 | 98 | 114 | 99 |
| 50 | 117 | 68 | 50 | 57.57 | 171 | 99 | 87 | 99 |
| 60 | 103 | 71 | 44 | 59.19 | 142 | 99 | 74 | 99 |
| 70 | 93 | 74 | 39 | 60.46 | 122 | 99 | 65 | 100 |
| 80 | 83 | 77 | 34 | 60.86 | 107 | 99 | 55 | 100 |
| 90 | 76 | 79 | 31 | 61.71 | 95 | 99 | 50 | 100 |
| 100-102 | 70 | 81 | 27 | 61.89 | 86 | 99 | 44 | 100 |

FIG. 7

APPARATUS AND METHODS FOR INTERFACING REPROGRAPHIC AND IMAGING SYSTEMS WITH MULTIPLE SET FINISHING DEVICES

TECHNICAL FIELD

This disclosure relates to reprographic, publishing, and imaging systems and, more particularly, to systems and methods for enabling increased productivity in reprographic, publishing, and imaging systems having multiple finishing devices.

BACKGROUND

High end reprographic and electronic imaging systems generally include an image output terminal (IOT) providing documents to one or more document finishing devices (DFDs) and/or one or more external finishing devices (EFDs). In such systems, the IOT generally controls the scheduling and flow of documents to the DFDs and/or EFDs. For such systems, the timing between successive sheets, whether of the same document or successive documents, is measured in pitches where a pitch is the standard time between the trailing edge of a sheet and the trailing edge of a next sheet.

Such high end reprographic and electronic imaging systems generally communicate via an interface such as, for example, Xerox's Document Finishing Architecture (DFA) as described in "Document Feeding & Finishing Standards DFA Level 1—Generic Specification", version 2.0.1, February, 1997, hereby incorporated by reference in its entirety. Xerox's DFA interface is a high level set of Xerox specifications for implementing the hardware and software interconnections between DFA compliant finishing and feeding devices, including DFDs and EFDs, and Xerox high-end electronic imaging and reprographic devices. The DFA interface specification is designed to be general enough to accommodate devices with different performance capabilities and specific enough to enable physical interconnection without significant hardware and software changes.

For some finishing equipment, pamphlet and book binding process time can require a large amount of actual time when compared to the time for the imaging or reprographic system to produce the documents that comprise the set. For example, one type of tape binder requires 26 seconds to complete the binding of a book and another type of auto binder requires 10 seconds to complete the binding of a book regardless of the size of the book. Systems including such binding devices operate with varying levels of productivity depending of the number of binding devices installed, the number of sheets per book (e.g., 2 to 102), the number of images per sheet (simplex or duplex), and the printer speed.

Under current hardcopy output delivery conditions, the document delivery mode from the IOT, which can be as high as 144 pages per minute (ppm) in some current systems, can be too fast for various finishing devices such as binders. For example, in a system printing pamphlets, if the bind time is 26 seconds, the printing system is required to pause printing between each pamphlet to wait for the binding process to be completed before continuing.

SUMMARY

In current practice, a single finishing device, DFD or EFD, is selected to receive documents until the finishing device reaches a full or unload state (that is, when its output bin becomes full or is being unloaded). More specifically, the S2 signal is declared from the DFA device. This signal is used by a device when the device becomes almost full. The S2 signal causes the IOT to cycle down upon completion of the remaining sets/sheets in progress. The extra time needed to finish each set must be accommodated by skipping print pitches between consecutive sets. Thus, the timing of sheets from the IOT to the DFDs/EFDs is facilitated by using "skip pitches," or the delay of a sheet by more than one pitch from the preceding sheet. However, such skip pitches are not optimal because they cause delay in the operation of the system.

Thus, there is a need to reduce the idle time of the IOT by reducing skipped pitches. This can be accomplished by providing finishing devices, or the IOT, with the ability to automatically designate the delivery destination for sheets of the next set to a finishing device different from the finishing device that was designated to receive sheets of the preceding set. This allows the finisher of the preceding set to complete its finishing task without affecting the system productivity by eliminating the need to skip pitches between consecutive sets.

BRIEF DESCRIPTION OF THE DRAWINGS

FIGS. 3B-3C show a table listing status signals S0-S7 according to the Xerox DFA-level 1 interface system.

DETAILED DESCRIPTION OF EMBODIMENTS

Figure 1:
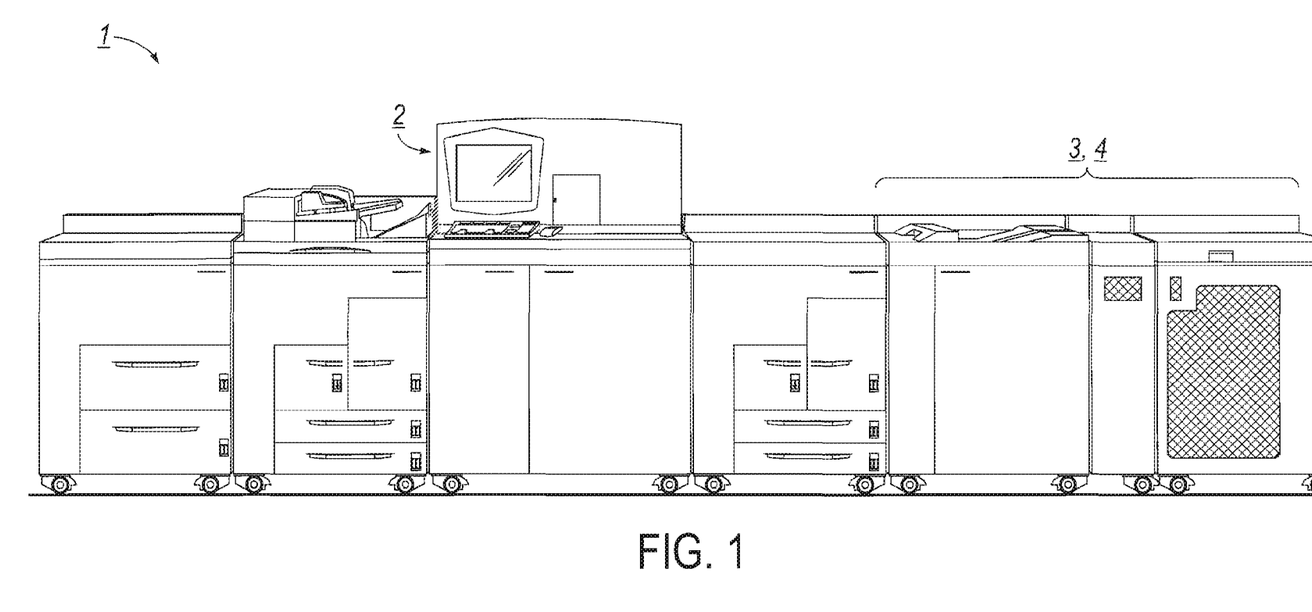
FIG. 1 shows one example of an electronic printing or reprographic system.

FIG. 1 shows one example of an electronic imaging or reprographic system. Electronic imaging system 1 includes an image output device, printer or IOT 2, a document finishing device or DFD 3, and an external finishing device or EFD 4. Finishing devices, DFDs and EFDs, can be devices such as, but not limited to, stackers, binders, staplers, stitchers, or any other finishing or paper handling device, or any combination of the foregoing.

In general, IOTs such as IOT 2 include a marking engine, a raster output scanner (ROS) or line marking array, a paper transport and delivery system plus a bypass transport, machine controllers, and an electronic interface to a print service processor. However, any other IOT able to interface with DFA compliant EFDs and DFDs can be used. IOTs may further include a user interface, a maintenance interface, a video data buffer, a command buffer, a test pattern generator, stand-alone diagnostics, and billing meters, for example.

DFDs and EFDs generally include a paper transport and delivery system, an electronic interface to interface with the IOT, mechanical latching mechanisms to latch with the IOT, and control electronics. DFDs and EFDs may further include finishing and feeding functions, a user interface, a maintenance interface, a test generator, stand-alone diagnostics, and billing meters, for example.

As used herein, "finishing" refers to any or all of a set of processes or operations applied to printed or imprinted documents. Finishing operations can include, for example, binding, stapling, varnishing, laminating, embossing, stripping, folding, collating, perforating, punching, stacking, and combinations thereof. Such operations can be applied to a set of documents.

Some finishing operations are performed inline with printing or production printing systems. In magazine or book printing, signatures are delivered from the printer or IOT 2 to the DFD 3 or EFD 4 that performs the document finishing such as by folding and binding (for example, by stapling) each set of documents.

In operation, IOT 2 produces jobs consisting of document sets, each document set comprising one or more sheets of recording media on which document images and/or text are recorded. These document sets are delivered to one of the DFDs 3 or EFDs 4 for finishing. IOT 2 generally contains a job scheduler which schedules the document jobs for delivery to the DFDs 3 and EFDs 4. In embodiments described below, document sets can be delivered in an "alternating delivery mode" in which an initial document set is delivered to a first DFD 3 or EFD 4, and the next document set is delivered to a different DFD 3 or EFD 4. In some embodiments, the IOT 2, such as by a job scheduler, determines which DFD 3 or EFD 4 to deliver each document set based on newly defined parameters enabling the IOT 2 to avoid delivering a document set to a DFD 3 or EFD 4 that is not ready to accept a new document set. In other embodiments, the determination of whether a given DFD 3 or EFD 4 can accept a document set is made by the DFD 3 or EFD 4 itself, which indicates to the system that a new document set about to be delivered needs to be directed to another finishing device. While these embodiments can be realized in a variety of systems and in a variety of ways, the following examples are presented making use of the Xerox Document Finishing Architecture (DFA) interface. However, the described concepts and techniques are not limited to systems using the Xerox DFA interface.

Figure 2A:
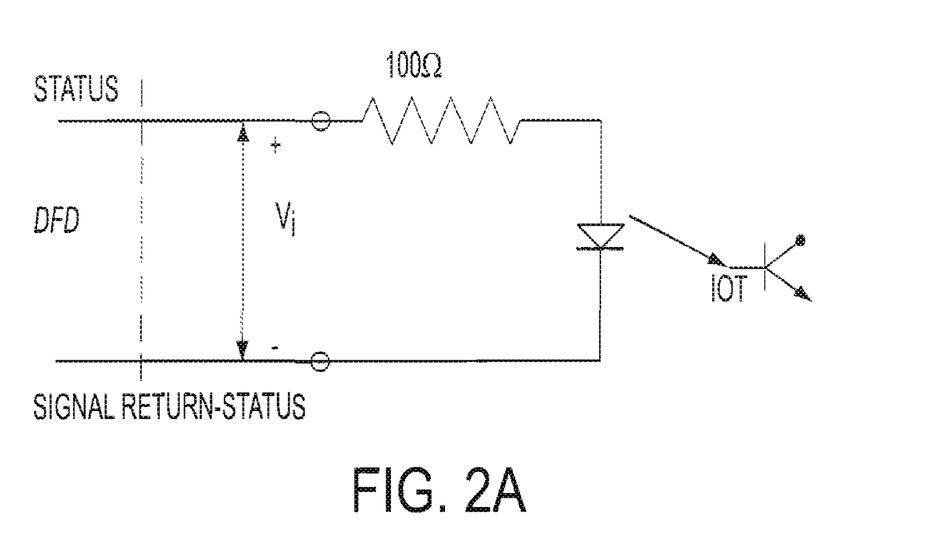
FIG. 2A shows a standard IOT hardware interface for receiving signals from DFDs and EFDs under the Xerox DFA interface.
Figure 2B:
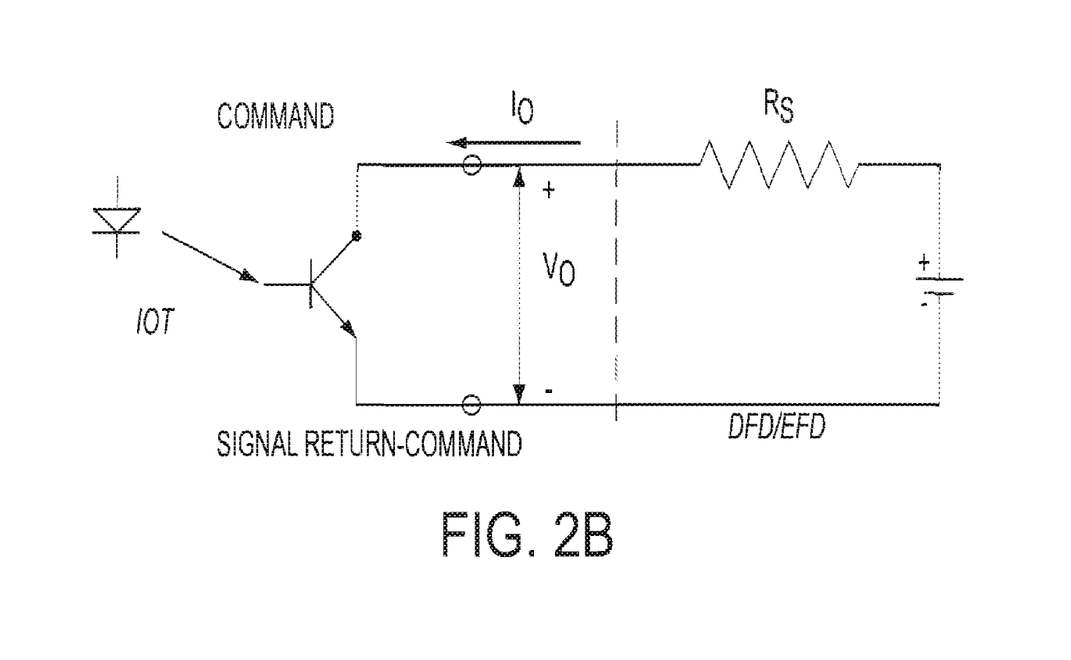
FIG. 2B shows a standard IOT hardware interface for sending signals to DFDs and EFDs under the Xerox DFA interface.

FIG. 2 shows the standard hardware interface between IOTs and DFDs and EFDs under the Xerox DFA interface. As shown in FIG. 2A, status signals from DFDs (and EFDs) are provided to the IOT by an optically isolated circuit having, for example, an optical diode in series with a signal path having a resistance of approximately 100 Ohms. As shown in FIG. 2B, commands from an IOT are provided to DFDs (and EFDs) by an optically isolated circuit having, for example, an optical diode in series with a signal path having a resistance of approximately 100 Ohms.

Figure 3A:
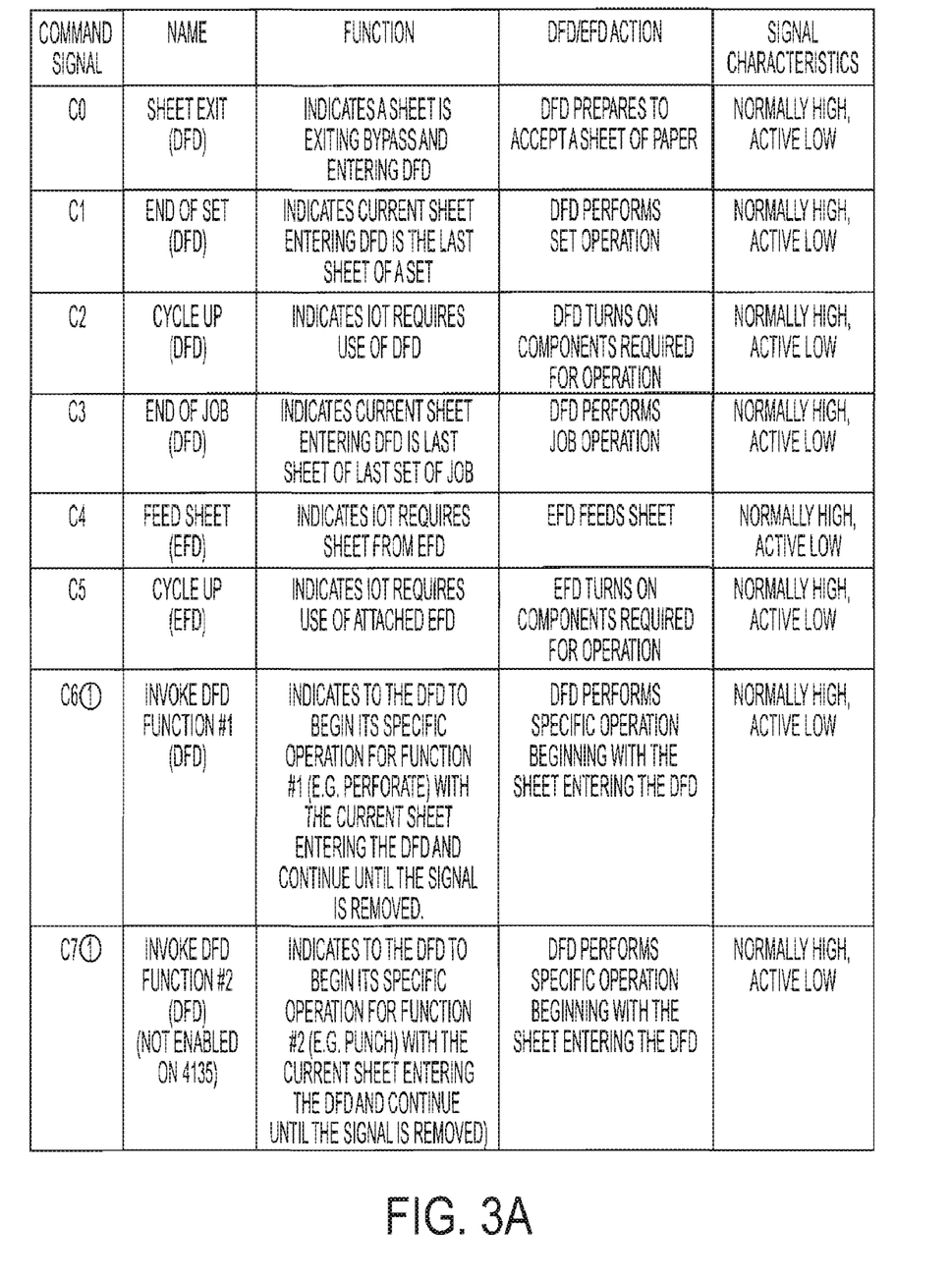
FIG. 3A shows a table listing command signals C0-C7 according to the conventional Xerox DFA-level 1 interface system.

FIG. 3A shows a table listing commands C0-C7 in the Xerox DFA level-1 interface. The command C0 indicates whether a sheet is exiting bypass and entering the DFD. The command C1 indicates to the receiving DFD that the current sheet entering the DFD is the last sheet of a set. The command C2 indicates to the receiving DFD that the IOT requires use of the DFD. The command C3 indicates to the DFD that the current sheet entering the DFD is the last sheet of the last set of a job. The command C4 indicates to the receiving EFD that the IOT requires a sheet from the EFD. The command C5 indicates to the receiving EFD that the IOT requires use of the attached EFD. The command C6 indicates to the receiving DFD that the DFD is to begin its specific operation for function #1 (for example, perforate) with the current sheet entering the DFD and continue until the signal is unasserted. The command C7 indicates to the receiving DFD that the DFD is to begin its specific operation for function #2 (for example, punch) with the current sheet entering the DFD and continue until the signal is unasserted. Under some embodiments described below, command C6 is provided with an alternative meaning.

As shown in the table of FIG. 3A, the commands C0-C7 are electrically represented by a bi-stable logic signal, such as provided by the circuit of FIG. 2B. For each of commands C0-C7, when the logic signal is high, the signal is inactive (unasserted) and when the signal is low, the signal is active (asserted).

Figure 3C:
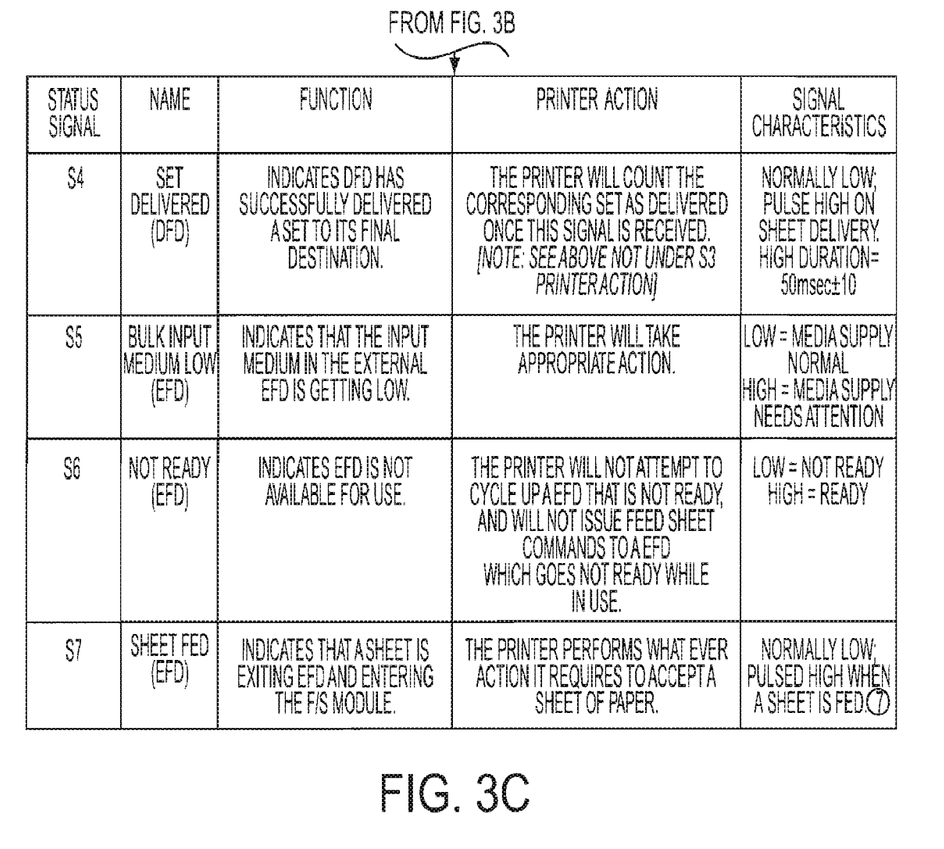

FIGS. 3B-3C show a table which lists some status signals S0-S7 that can be provided by DFDs and EFDs to the IOT. As shown in the table of FIGS. 3B-3C, S0 indicates that the DFD is off-line; S1 indicates that the DFD is faulted; S2 indicates the DFD is full; S3 indicates the DFD has successfully delivered a sheet to its final destination; S4 indicates that the DFD has successfully delivered a set to its final destination; S5 indicates that the input medium in the EFD is low; S6 indicates that the EFD is not ready; and S7 indicates that a sheet is exiting the EFD.

Figure 3D:
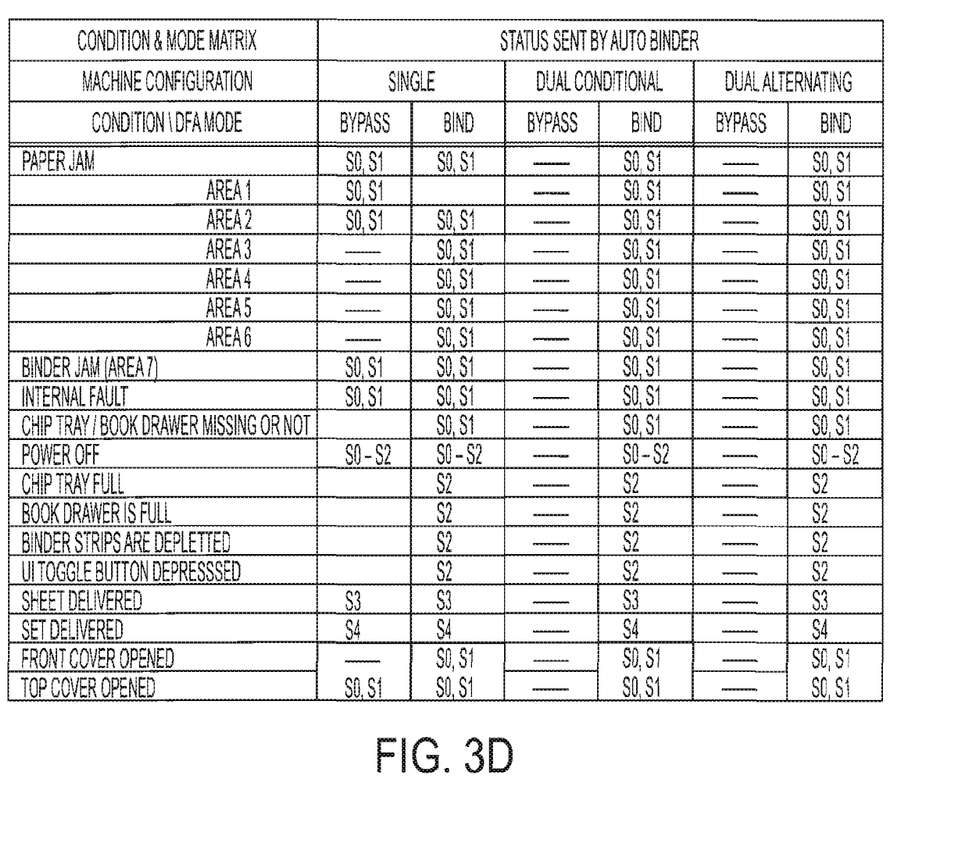
FIG. 3D shows a table listing the use of status signals S0 and S1 for various conditions.

FIG. 3D shows a table listing the use of status signals S0 and S1 for various conditions under the single DFD/EFD system configuration, the dual conditional mode DFD/EFD system configuration, and dual alternating mode DFD/EFD system configuration.

Under the DFA interface, the System Administrator can create and define device profiles for the configuration of attached, external DFA level-1 compliant third party DFDs and EFDs. Device profiles are also called finisher profiles or DFA profiles. Each external device will have at least one device profile and may have at least one finisher profile. These devices, referred to as external finishers, are connected to the printer or imaging device 2 through a bypass transport. The DFA profile(s) for each device are unique and describe the external finisher to the printing system.

A device profile describes an external device to the IOT. The device profile defines parameters for the DFD or EFD required under the DFA interface. Typical parameters included in a device profile include: Name—this parameter must be unique and identifies the device; Type—this parameter defines which of two options for the device, external or signature booklet maker; Function 1 and 2—these two parameters define the mode of operation for one or two functions to be dynamically invoked in the device; Sheet Sequence—this parameter has the options of "1 to N" or "N to 1" and specifies the sequence of how sheets are delivered to the device from the bypass transport; Side 1 Direction—this parameter has the options of "face up" or "face down" and defines how the sheets are delivered to the device; Rotate—this parameter has the options of "always" or "never"; and various other fields. Other examples of definitions for the device profile are contained in "Xerox Nuvera Digital Production System In-Line Finishing (DFA) Resource Guide, version 2.1, October 2005, which is hereby incorporated by reference in its entirety. The timing parameters included in the device profile instruct the IOT of the timings necessary to properly interact with the device.

Multiple device or finisher profiles for a DFD or EFD allow for a DFD or EFD to serve alternate roles, for example, a DFD or EFD might be capable of both binding and stitching or binding and stapling. For such a device, a finisher profile for each configuration (binding and stitching) must be created for the device to be able to be used in both modes. Parameters specified in finisher profiles include: Name—this parameter must be unique and identifies the device; Device Type—this parameter defines whether the device is a finishing or stacking device; Finisher Type—this parameter defines the device type; Function 1 and 2—these parameters define the capabilities of the device provided the reprographic or imaging system has the capabilities specified; and other parameters. Further definitions for finisher profiles are contained in "Xerox Nuvera Digital Production System In-Line Finishing (DFA) Resource Guide, version 2.1, October 2005, previously incorporated by reference in its entirety.

In current imaging systems configured with multiple DFA-1 set finishing devices of the same type, the printing system only offers the traditional delivery mode. In this mode, the printing system delivers printed sheets to one device at a time until either a full or unload condition occurs at that device, and then printing continues with output delivery switched to a different finishing device. In other words, sheets are continually fed to a particular finishing device until that device's output bin becomes full or the device is being unloaded.

As an example, when two or more GBC Auto Binders are installed together (in tandem), by default they will switch back and forth between binders when binding books to ensure productivity is maximized. It is the DFA finishing machine's responsibility to control for this switching within the finishing device and it is transparent to the IOT, in this example, a Nuvera system. The Nuvera system will need to account for the time used for a current book's imaging in the previous book's required bind time in order to optimize productivity The DFA Finishing firmware's implementation of Function 1 and Function 2 (C6 & c7) is required to offer a profile selectable Conditional Delivery mode or Alternating Delivery mode when the configuration has multiple binder devices chained together. The auto switching delivery mode is selected via a print stream on a job basis using Function 1 and Function 2 or the customer could select it in the DFA Finisher Profile.

In the Conditional Delivery mode, books are delivered to one device until either a Full or Unload condition occurs. In this mode, automatic binder switching occurs when a binder becomes full or the user unloads the binder while the system is printing. Printing continues with output delivery switched to a different binder. In the Alternating Delivery mode, books are alternately delivered to each binder device to provide increased productivity.

Additional IOT Set Delay Time DFA timing parameters add one or two DFA timing parameters to the profile form to support, for example, GBC and GRADCO Binders. The additional IOT Set Delay Time parameters will be used to enable maximum productivity in the alternating delivery mode by a mark facility controller (MFC). A MFC is a controller which is in communication with the controllers of the finishing devices. Generally, the MFC controls the modules that comprise the digital printing system. It directs feeding devices to deliver the appropriate size and type of paper or other media to a printer 2 at the appropriate time. The mark facility controller also coordinates the delivery of images to the printer 2 and directs it to print those images on the media delivered to it by the feeding devices. It then orchestrates the delivery of printed pages to the appropriate finishing device.

The new parameters allow for delay times to be added between every other set (i.e., between Set #1 and Set #3). IOT Set Delay Times are required when using 1 or 2 binders depending on the set/book size. As noted above, if time required for the finishing device to perform its finishing task (for example, binding) is relatively long, then skipped pitches must be inserted between the last sheet of one set and the first sheet of the next set. This reduces productivity of the publishing system and the customer.

Figure 4:
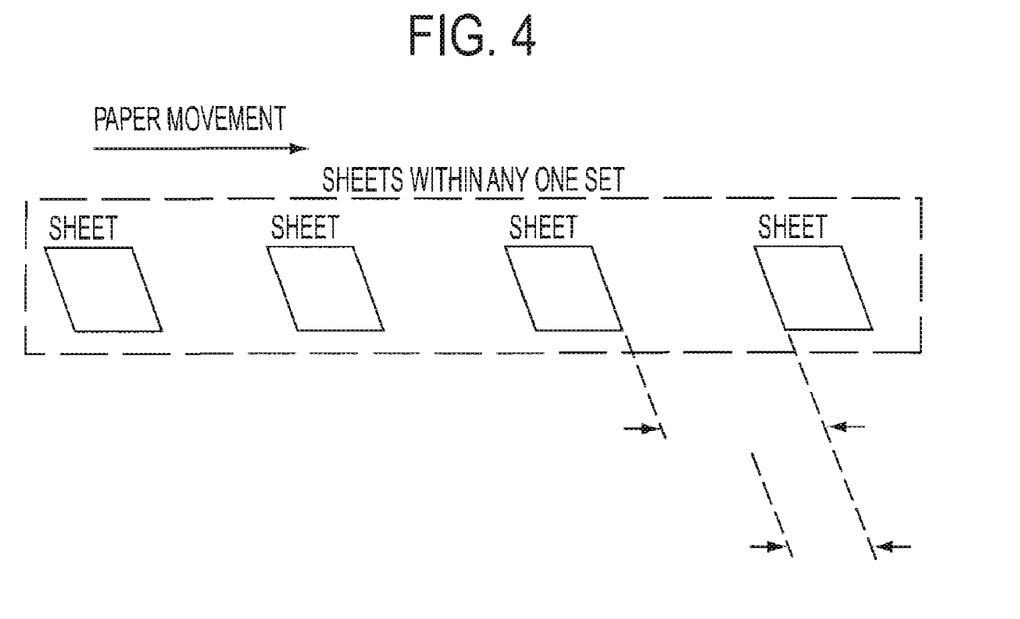
FIG. 4 shows the flow of sheets within one set.

Under the current DFA interface standard there are two ways that inter-sheet gaps are set for any DFA finishing device. For non-DFA modules, the inter-sheet gap is in a data file that is internally passed within the software system. For DFA devices, there are two parameters in the device or finisher profile. As shown in FIG. 4, one of these parameters is "time between sheets." The second one of these parameters is "time between sets." These values are determined and implemented by the manufacturer of the external DFA device.

Time Between Sheets—This parameter defines the maximum time, measured in milliseconds, required by the finishing device to process one sheet of a set and to be ready to accept the next sheet of the same set. As shown in FIG. 4, this time is measured from the trailing edge of a first sheet (sheet "n") in a set to the leading edge of the next sheet (sheet "n+1") in the same set. This parameter does not apply between the last sheet of a first set and the first sheet of a second set (see the parameters of Maximum Set Processing Time and Time Between Sets). A printer must always guarantee that, within a set, there is always a time value of a duration at least equal to Time Between Sheets (ms) between the trailing edge of a sheet (sheet "n") and the leading edge of the next sheet (sheet "n+1") within the same set. It is not guaranteed that the time between the trailing edge of the nth sheet and the leading edge of the n+1th sheet will be Time Between Sheets. Rather, the time will be equal to or greater than Time Between Sheets. Under the DFA specification, IOTs generally measure times based on either the leading or trailing edge of a sheet by the last sensor in the bypass transport.

Time Between Sets—This parameter defines the maximum time, measured in milliseconds, for a finishing device to complete finishing of a first set and to be ready to accept a second set for finishing from the IOT.

This disclosure provides apparatus and methods for improving the productivity of reprographic and imaging systems. In particular, in some embodiments, additional timing parameters are defined for use under the DFA interface and additional uses for certain commands, C6 and C7, are defined. The additional parameters are used by the job scheduling software algorithm when in an "alternating delivery" mode. The additional parameters allow for delay times to be optimized between each set produced by the IOT. This enables improved productivity for reprographic and imaging systems not possible previously.

Figure 5:
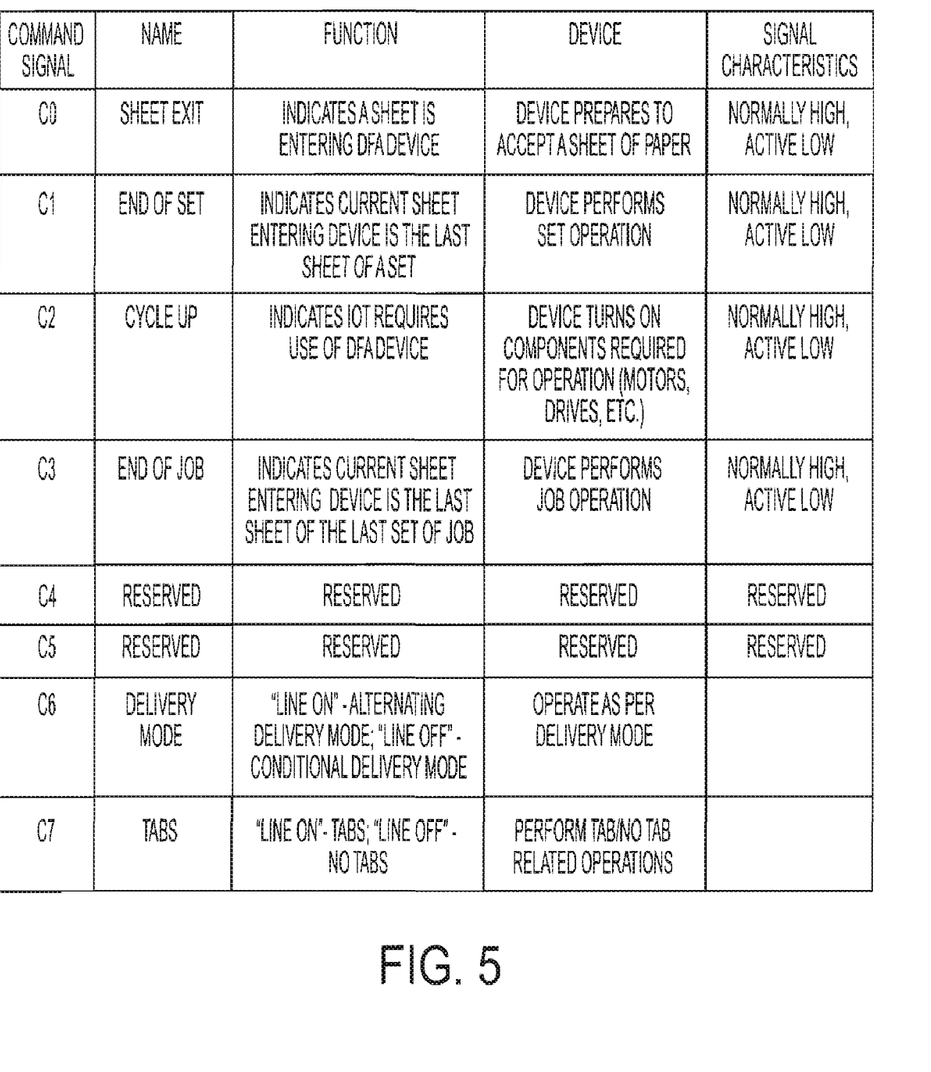
FIG. 5 shows a table listing command signals C0-C7 usable with the Xerox DFA-level 1 interface system according to some embodiments described herein.

FIG. 5 shows the additional definition attached to command C6 according to some preferred embodiments. As shown in FIG. 5, C6, named "delivery mode," controls whether the DFD or EFD that receives the command is to operate under alternating delivery mode, defined as the "line on" signal (logic low), or not, defined as the "line off" signal (logic high). The alternating delivery mode can be selected when two or more similar finishing devices are included in the system.

In a printing system having multiple (two or more) DFA set devices of the same type, when the alternating delivery mode is enabled, sets are alternately delivered to each finishing device (that is, no finishing device receives two consecutive sets). In the alternating binder delivery mode, books or pamphlets are delivered to each binder device to provide increased productivity. In this mode, the IOT may time consecutive sets closer to each other than a single binding device can handle. This is possible because consecutive sets are sent to different binding devices. In some embodiments, when in alternating delivery mode, the first set will be delivered to an available binding device located farthest downstream of the IOT. Each successive set will be delivered to an available binding device located upstream from the binding device to which the previous set was delivered. Once the binding device located farthest upstream is reached, the process repeats starting from the farthest downstream binding device. A special profile that is less productive may be used if a binding device in the middle of the DFA train is not available to bind.

Figure 6:
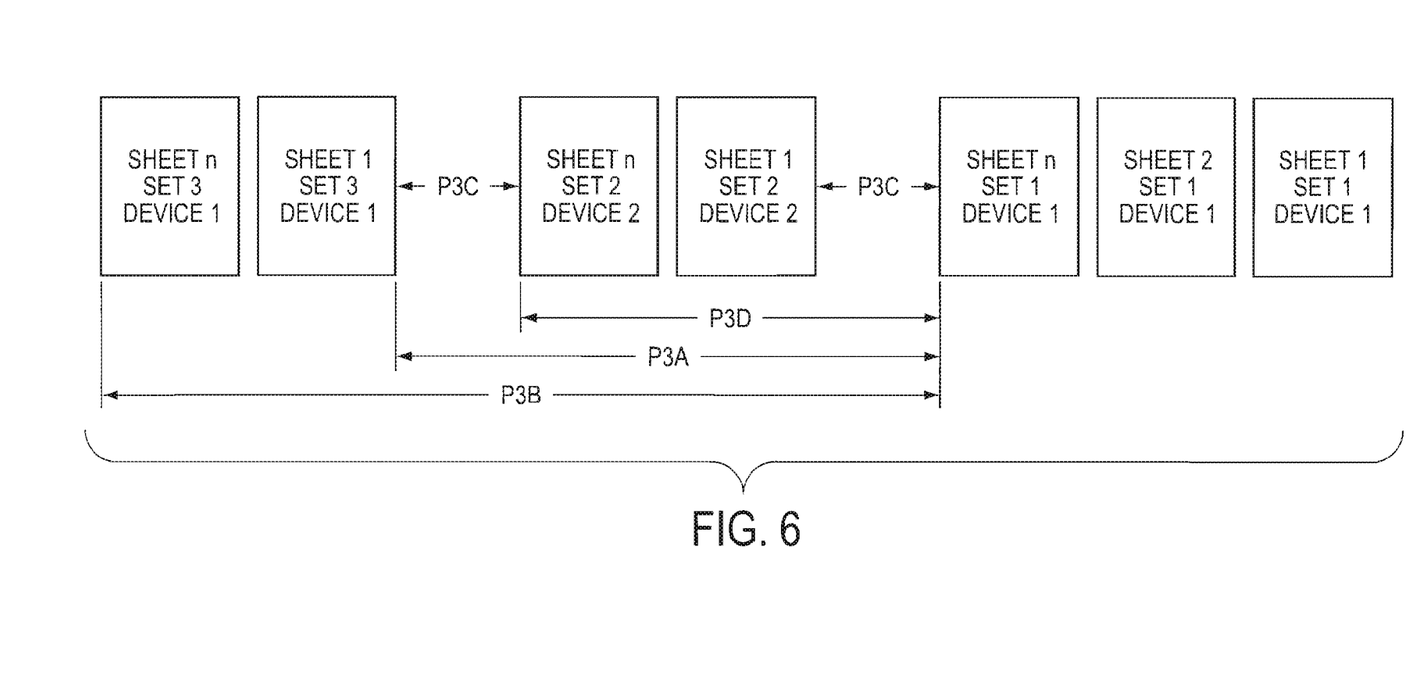
FIG. 6 shows a delay time diagram for one variation of increasing the productivity of a reprographic system having two finishing devices.

FIG. 6 shows a delay time diagram for a system employing two finishing devices operating in alternating delivery mode according to some embodiments. P3A, P3B, P3C, and P3D are shown. These time variables are implemented to accommodate for varying machine conditions depending on where the device is located in the finishing train. These values represent minimum system requirements required to ensure that the finishing devices receive and process their document sets without jamming. Further, the controller can use these values to ensure, when necessary, that the finishing devices receive and output finished documents in the same order as output by the IOT or, alternatively, in a predetermined order.

P3A is measured between the trailing edge of the last sheet of a document set sent to a finishing device (e.g., device 1, set #1) and the leading edge of the first sheet of the next document set sent to the same finishing device (e.g., set #3).

P3B is the time between sets measured between the trailing edge of the last sheet of a first set delivered to a finishing device (e.g., device 1, set #1) and the trailing edge of the last sheet of a next set delivered to the same finishing device (e.g., device 1, set #3).

The parameter P3C provided by this disclosure defines the minimum time required between the trailing edge of the last sheet of a document set output by the IOT and the leading edge of the first sheet of the next document set following the first document set output by the IOT. Thus, P3C defines the minimum required tome to between document sets output by the IOT to enable the document sets to be delivered without jamming or other problems. Under alternating delivery mode, P3C defines the minimum system time to switch between two DFD/EFD modules. It generally is a small value and can include the actual bypass time (including the time to switch a diverting gate), the time to stop the first DFD/EFD, a timing tolerance value, and a delivery delay time.

Parameter P3D, defined by this disclosure, is the time measured between the trailing edge of a last sheet of a first document set (e.g., set #1) and the trailing edge of a last sheet of the next document set (e.g., set #2). P3D can be used to ensure that document sets are finished and delivered in order of output from the IOT.

Feeding a set to a different finishing device during the time period defined by parameter P3A improves productivity by reducing IOT wait time between consecutive sets as compared with job scheduling in which the IOT must pause the time period of P3A so that the next set is fed to the same finishing device. The IOT 2 knows, based on the time of delivery of the last sheet of a document set to a given DFD 3 or EFD 4, when the DFD 3 or EFD 4 will be ready to accept a next document set. The parameters P3A, P3B, P3C, and P3D are IOT Set Delay Time DFA timing parameters and can be included in the finisher profiles of the finishing devices.

In some embodiments, additional IOT Set Delay Timing Parameters are defined to enable the IOT 2's job scheduler to maximize productivity in the alternating delivery mode. The IOT Set Delay Timing Parameters include, in addition to the Module Switch Time (P3C), the Number of Modules.

Module Switch Time (P3C)—this parameter, measured from 0 to 32767 milliseconds, is the time between the trailing edge of the last sheet of a first set and the trailing edge of a first sheet of the next set. This parameter can only be used when the number of modules exceeds one.

Number of Modules—This parameter, able to range from one to 10 identical modules, identifies the number of identical modules installed next to each other downstream of the IOT. The factory default setting is one. This parameter is typically used in the alternating delivery mode for multiple binding devices such as, for example, Auto Binders or Tape Binders.

In these embodiments, the IOT 2 uses the Module Switch Time, Number of Modules parameter, and predetermined order of finishing devices to determine, in a system having two or more identical finishing devices, once a document set has been delivered to a first DFD or EFD device, which finishing device should receive the next output. These additional IOT Set Delay Time parameter enable maximum productivity to be achieved in the alternating delivery mode by the job scheduler. IOT Set Delay Times are required when using one or more binding devices depending on the set/book size. The System Administrator is able to set and change these additional IOT Set Delay Timing Parameters in the DFA profile.

By way of an example, the IOT Set Delay Times and other parameters as used during one possible operation of the system are hereafter described. From the finisher profiles on the system, the IOT knows the maximum value for P3C, the number of modules, and the predetermined order. In this example, P3C, the minimum time between sets, is 0.1 second and is determined from the finisher profiles of the finishing devices. This is the minimum time, over all of the finishing devices, that the system can guarantee that document sets can be delivered without causing a jam or other problems.

In operation, the system is set up, by a user or by the IOT 2, to operate in alternating delivery mode. The IOT then outputs the first document set and the master controller of the finishing devices ensures, by signaling the controllers of the other finishing devices as needed, which finishing device is to receive the first document set. The respective controllers of finishing devices on the document transport cause the diverter gates of the document set transport to switch into the proper mode to ensure the delivery of the first document set to the correct finishing device. The modes of the diverter gates are either to divert document sets to bypass the associated finishing device or to deliver the document sets to the associated finishing device. When the IOT outputs the last page of the first document set, it signals an end of set to the master controller. Thus, the master controller then signals the appropriate controllers to ensure the document set transport is configured to deliver the next document set to the appropriate finishing device according to the predetermined order. Because the number of modules is known, the IOT and master controller know when the predetermined order must loop such that the next document set must be delivered to the finishing device that received the first document set.

Figure 7:
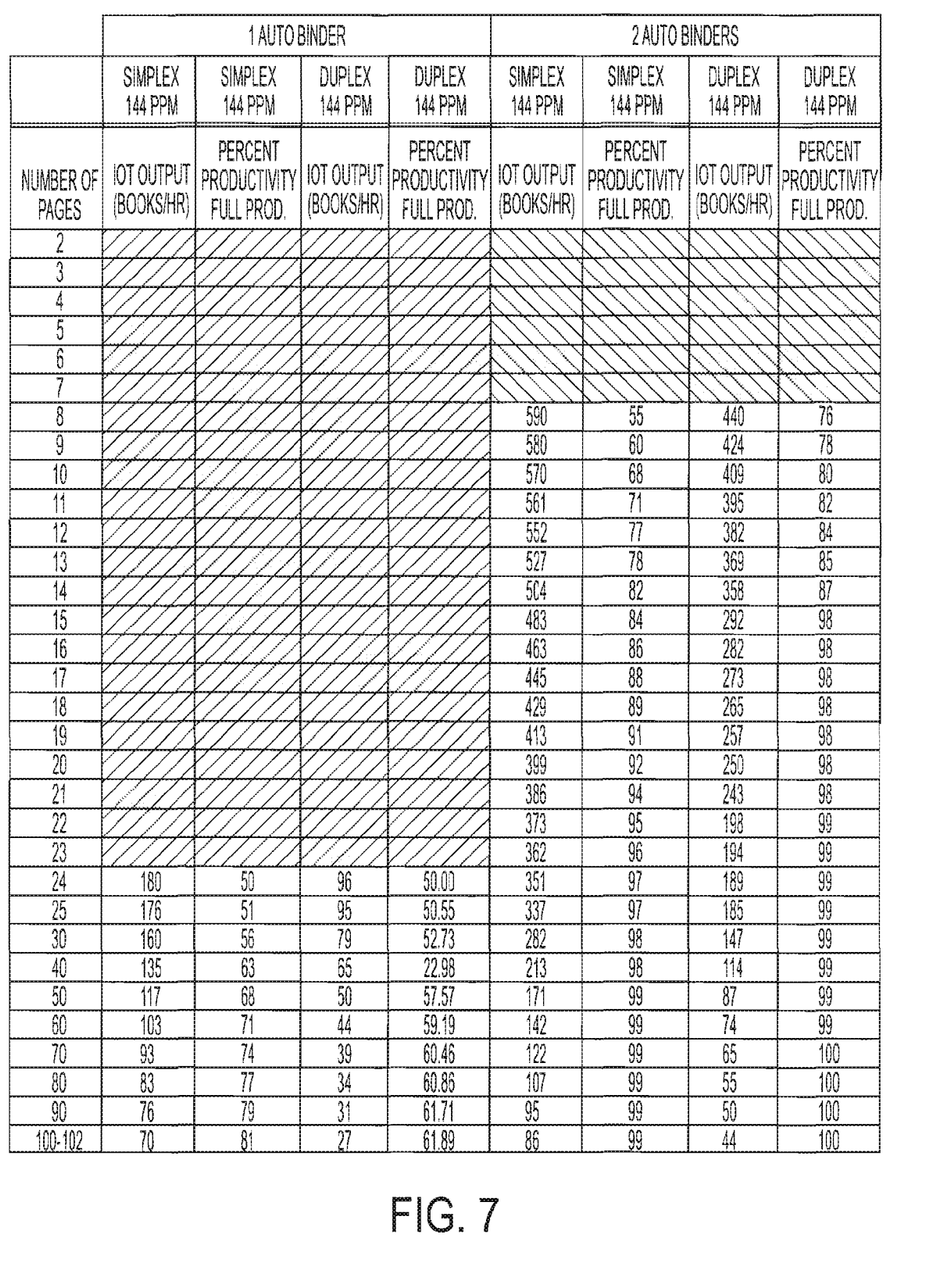
FIG. 7 shows a comparison between the process times using one finishing device and two finishing devices.

FIG. 7 shows a comparison between the process times using one finishing device and two finishing devices in books per hour for varying numbers of pages per book. As can be seen by comparing the times for a single binder versus two binders operating in alternating mode, the number of books per hour produced by the tandem configured system is higher than that of the single binder system for books having the same number of pages.

In some other embodiments, the IOT 2 wait time (skip pitch time between consecutive sets) can be eliminated or minimized during finishing mode conditions by enabling the finishing devices to determine, under the alternating document set output delivery mode, whether they will accept a next document set that is to be delivered. Under these embodiments, the IOT 2 issues a C6 command, which instructs the finishing devices that they are to operate under the alternating delivery mode. Then, a finishing device, if it is not ready to accept an incoming document set, can designate a next finishing device for receiving the document set being delivered. In variations, this can be done by the IOT 2 controlling software which communicates with a finishing device at the end of a set. If the finishing device is not ready to receive a document set, the finishing device issues a status signal indicating it is not ready (e.g., by sending S6). Under these embodiments, when multiple finishing devices that perform binding are linked in succession (e.g., tandem), the sequence of printed output document sets from the IOT are alternately sent to each device, one set at a time, to provide maximum productivity.

This is generally done by the master finisher controller. The master finisher controller communicates with the controllers of the necessary finishing devices to cause the controllers of the finishing devices to control their document transport path segments so that the document sets are delivered to the finishing devices in a predetermined alternating manner. Generally, the order of delivery of document sets begins with the finishing device which is the farthest from the IOT on the document transport path, proceeds to teach finishing device that is successively closer to the IOT on the document transport path, and finishes with the finishing device that is closest to the IOT on the document transport path. Thereafter, the order loops by returning to the finishing device having the longest document transport path between it and the IOT and the order continues as before. This variation optimizes document set delivery to ensure productivity is maximized.

As an example, for a system having two finishing devices of the same type and manufacturer in a dual configuration, the finishing devices communicate to each other by use of their software and/or firmware. Generally, the finishing device (device #1) that is closest to the IOT on the document transport path will have the master finisher controller. In operation, generally the first document set will be routed to the finishing device (device #2) further away from the IOT. The second document set will then be delivered to device #1. Thereafter, the document sets are alternated between the two devices accordingly. This mode can accommodate any desired number of finishing devices in a similar manner by use of a predetermined order for the finishing devices. Further to this mode, all the finishing devices fill up simultaneously. Thus, a point can be reached where all the finishing device are full simultaneously, forcing the IOT to cease output of document sets.

In more detail, further to these embodiments, document sets are delivered in a rotating manner, beginning with the finishing device that is the farthest downstream of the IOT. Each document set thereafter is delivered to the next finishing device available and ready that performs binding upstream of the finishing device that received the prior document set. Once a document set is delivered to the finishing device that performs binding farthest upstream (closest to the IOT), the process is repeated from the finishing device that performs binding farthest downstream of the IOT.

As described above, the conditional delivery mode for delivery of document sets to finishing devices requires delivery of document sets to the same finishing device until that finishing device reaches a full state. Conditional delivery mode has the advantage of allowing the unloading of a finishing device while the IOT continues to output document sets to another finishing device.

Current systems operate in a traditional mode such that when a finishing device reaches a predetermined capacity of its rated output, the finishing device signals the IOT so that the IOT knows how many more document sets can be delivered to the finishing device.

In an embodiment, the expected behavior of the finishing devices in conditional delivery mode is different from that in traditional systems. In this embodiment, when a first finishing device reaches the point where it needs to signal the IOT that it has reached a predetermined amount of its capacity, the master controller for the finishing devices causes all of the finishing devices to signal that they are in a full state. Thus, the IOT sees all the finishing devices are signaling a full state and ceases output of any more document sets after it delivers all of the document sets to the first finishing device that the first finishing device is due to receive. The stacker for the first finishing device is then lowered, the full signals are deasserted by the finishing devices, and the IOT resumes output of document sets to a new finishing device.

Because alternating delivery mode and conditional delivery mode each have different advantages and disadvantages, the printer controller (IOT controller), in an embodiment, can switch between these modes. In this embodiment, which can be referred to as adaptive delivery mode, when the IOT reaches a set of document sets that must be printed and stacked in order, the IOT causes the finishing devices to enter the conditional mode. This situation could occur, for example, when a group of predetermined documents need to be packaged together for delivery to a third party. Further to this embodiment, when the IOT reaches a set of documents which do not have to be finished and physically stacked in order, the IOT can cause the finishing devices to enter alternating mode so that the use of the finishing devices is maximized.

It will be appreciated that various of the above-disclosed and other features and functions, or alternatives thereof, maybe desirably combined into many other different systems or applications. Also, various presently unforeseen or unanticipated alternatives, modifications, variations or improvements therein may be subsequently made by those skilled in the art, and are also intended to be encompassed.

What is claimed is:

1. A control system that controls a document production system having an image output terminal (IOT) that produces document sets of sheets having images thereon, at least two similar finishing devices that receive the document sets, and a document set transport connected between the IOT and the finishing devices, the control system comprising:
   a master controller in communication with the document set transport, wherein when the master controller detects an end of set command from the IOT for a first document set being delivered to a first finishing device of the finishing devices, the master controller issues a signal that causes the document set transport to deliver a second document set to a second finishing device of the finishing devices, bypassing the first finishing device, wherein
   the second finishing device is a next finishing device from the first finishing device according to a predetermined order, and
   the predetermined order is a continuous loop in which the finishing devices are ordered by their transport distance from the IOT on the document set transport,
   the loop beginning with one of the finishing devices having a longest transport distance between it and the IOT,
   the loop continuing from a last finishing device back to the one finishing device having the longest transport path such that the last finishing device is the finishing device with a shortest transport path between it and the IOT.

2. The control system of claim 1, wherein the master controller is in one of the finishing devices.

3. The control system of claim 2, wherein the master controller is in the finishing device that is located closest to the IOT of all the finishing devices on the document set transport.

4. The control system of claim 1, wherein when the master controller detects an end of set command for the second document set being delivered to the second finishing device, the master controller issues a signal that controls the document set transport so that a next document set bypasses the second finishing device and is delivered to a next available finishing device of the finishing devices.

5. The control system of claim 1, wherein the master controller signals the IOT that all of the finishing devices are full when all the finishing devices are full or when all of the document sets to be processed by the finishing devices have been processed by the finishing devices, wherein the IOT ceases production of further document sets when informed that all the finishing devices are in a full state.

6. The control system of claim 1, wherein
each finishing device has a controller, the controller of one of the finishing devices being the master controller, the master controller being in communication with the controllers of the other finishing devices,
the document set transport comprising at least one finishing device diverter gate, each of the at least one finishing device diverter gate being associated with a controller of one of the finishing devices, the associated controller causing the associated finishing device diverter gate to divert a document set to bypass the finishing device of the associated controller or to deliver the document set to the finishing device of the associated controller, the associated controller causing the associated diverter gate to divert or deliver the document set based on a signal from the master controller.

7. The control system of claim 1, further comprising:
an optimization unit in the IOT that maximizes a productivity measure by controlling the distribution of document sets based on a known operating characteristic of the finishing devices.

8. The control system of claim 7, wherein the productivity measure is a minimum required time between document sets.

9. The control system of claim 8, wherein the minimum required time between document sets is defined as the time between the trailing edge of a last sheet of a first document set and the trailing edge of a last sheet of a next document set delivered to the same finishing device.

10. The control system of claim 8, wherein the minimum required time between document sets is defined as the time between the trailing edge of a last sheet of a first document set output by the IOT and the leading edge of a next document set output by the IOT.

11. The control system of claim 8, further comprising:
a memory; and
a document profile associated with each finishing device and stored in the memory, the document profile being readable by the optimization unit, at least one of the document profiles including an entry for the minimum required time between document sets required by the corresponding finishing device.

* * * * *